(12) United States Patent
Gao et al.

(10) Patent No.: US 11,895,660 B2
(45) Date of Patent: Feb. 6, 2024

(54) CHANNEL STATE INFORMATION REPORTING IN WIRELESS COMMUNICATIONS

(71) Applicant: ZTE Corporation, Guangdong (CN)

(72) Inventors: Bo Gao, Guangdong (CN); Yu Ngok Li, Guangdong (CN); Zhaohua Lu, Guangdong (CN); Yijian Chen, Guangdong (CN); Shujuan Zhang, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/660,819

(22) Filed: Apr. 26, 2022

(65) Prior Publication Data
US 2022/0264558 A1    Aug. 18, 2022

Related U.S. Application Data

(63) Continuation of application No. 17/037,176, filed on Sep. 29, 2020, now Pat. No. 11,343,810, which is a continuation of application No. PCT/CN2018/081061, filed on Mar. 29, 2018.

(51) Int. Cl.
H04W 72/21    (2023.01)
H04B 17/318   (2015.01)
(Continued)

(52) U.S. Cl.
CPC .......... *H04W 72/21* (2023.01); *H04B 17/318* (2015.01); *H04L 5/0051* (2013.01); *H04W 72/563* (2023.01)

(58) Field of Classification Search
CPC ... H04W 72/21; H04W 72/563; H04W 24/08; H04W 24/10; H04B 17/318;
(Continued)

(56) References Cited

U.S. PATENT DOCUMENTS

| 2014/0211873 | A1  | 7/2014 | Park et al. |
| 2017/0026100 | A1* | 1/2017 | Wang .................... H04W 72/12 |
| 2017/0238297 | A1  | 8/2017 | Benjebbour et al. |

FOREIGN PATENT DOCUMENTS

| CN | 104303477 A | 1/2015 |
| CN | 104937972 A | 9/2015 |

(Continued)

OTHER PUBLICATIONS

International Search Report and Written Opinion, PCT/CN2018/081061 dated Dec. 19, 2018, 4 pages.
(Continued)

*Primary Examiner* — Kabir A Timory
(74) *Attorney, Agent, or Firm* — Perkins Coie LLP

(57) ABSTRACT

A wireless communication method is described for receiving a reporting configuration associated with one or more reporting criteria. The received reporting configuration is also linked to one or more channel state information (CSI) resource settings that provide a configuration information. Each CSI resource setting identifies one or more resource sets, and each resource set includes one or more reference signal resources. Based on one or more reporting criteria, a user equipment can generate a report that can be transmitted to a base station.

20 Claims, 12 Drawing Sheets

(51) Int. Cl.
*H04L 5/00* (2006.01)
*H04W 72/563* (2023.01)

(58) Field of Classification Search
CPC .... H04B 7/0628; H04B 7/0417; H04B 7/063; H04B 7/0632; H04L 5/0051; H04L 1/0026; H04L 5/0057
See application file for complete search history.

(56) References Cited

FOREIGN PATENT DOCUMENTS

| CN | 107852219 | 7/2016 |
|---|---|---|
| CN | 106170942 | 11/2016 |
| WO | 2016/177299 A1 | 11/2016 |
| WO | 2017/078338 | 5/2017 |

OTHER PUBLICATIONS

European Extended Search Report, EP Application No. 18912127.0, dated Jul. 6, 2021, 11 pages.
ZTE, Sanechips "Discussion on beam management," 3GPP TSG RAN WG1 Meeting NR#3 Nagoya, Japan, Sep. 18-21, 2017, R1-1715440, 11 pages.
ZTE, "Discussion on beam measurement and reporting," 3GPP TSG RAN WG1 Meeting #90 Prague, Czechia, Aug. 21-25, 2017, R1-1712297, 12 pages.
Nokia, "Introduction of further enhancements on MIMO for NR," 3GPP TSG-RAN WG1 Meeting #107-e, R1-2112949, Electronic Meeting, Nov. 11-19, 2021 21 pages.
Huawei, "Introduction of Further enhancements on MIMO for NR," 3GPP TSG-RAN WG1 Meeting #107-e, e-Meeting, R1-2112941 Nov. 11-19, 2021, 72 pages.
Co-Pending EP Application No. 18912127.0, Article 94 Communication dated Mar. 24, 2023, 6 pages.
Co-Pending CN Application No. 201880091736.0, Office Action dated Oct. 28, 2023, 10 pages with unofficial translation.
Gao, et al. "Standardization Progress of Massive MIMO" Network Technology and Plan Department, China Telecom Beijing Research Institute, Beijing; China Academic Journal Electronic Publishing House; 12 pages with machine translation.

* cited by examiner

CHANNEL STATE INFORMATION REPORTING IN WIRELESS COMMUNICATIONS

CROSS-REFERENCE TO RELATED APPLICATION(S)

This application is a continuation of U.S. patent application Ser. No. 17/037,176, filed Sep. 29, 2020 which is a continuation of and claims priority to International Application No. PCT/CN2018/081061, filed on Mar. 29, 2018, the disclosure of which is hereby incorporated by reference herein in its entirety.

TECHNICAL FIELD

This disclosure is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques for channel state information reporting are disclosed. An exemplary embodiment discloses a wireless communication method. The exemplary method includes receiving a reporting configuration associated with one or more reporting criteria, the reporting configuration linked to one or more channel state information (CSI) resource settings that provide a configuration information, where each CSI resource setting identifies one or more resource sets, and each resource set includes one or more reference signal resources. The exemplary method includes generating, according to the one or more reporting criteria, the report that includes at least one of a reference signal receive power (RSRP), a rank indicator (RI), one or more reference signal indexes, and information about grouping the one or more reference signal indexes, where each reference signal index is associated with at least one of a CSI resource setting index, a reference signal resource set index, a reference signal resource index, and a reporting configuration index. The exemplary method also includes transmitting the report to a communication node.

In some embodiments, the one or more reporting criteria includes at least one of: one or more criteria for grouping one or more reference signal indexes to be reported, where the one or more reference signal indexes are grouped into one or more reference signal groups, a number of reference signal (RS) resources from one resource set or from one CSI resource setting to be reported, a minimum number of RS resources from one resource set or from one CSI resource setting to be reported, a maximum number of RS resources from one resource set or from one CSI resource setting to be reported, a number of resource sets from one CSI resource setting to be reported, a minimum number of resource sets from one CSI resource setting to be reported, a maximum number of resource sets from one CSI resource setting to be reported, a maximum number of RS resources or one RS resource to be reported for one or more subsets of one resource set, or one or more scaling factors to scale one or more measured RSRPs associated with one or more reference signal indexes or associated with one or more transmission or receive spatial domain filters.

In some embodiments, one of the criteria for grouping reference signal indexes includes at least one of a number of groups to be reported, a number of reference signal indexes per group to be reported, or a number of reference signal indexes per sub-group to be reported.

In some embodiments, one of the criteria for grouping includes at least one of a maximum RSRP gap between at least two groups, a maximum RSRP gap between the respective reference signal resources associated with at least two groups, a maximum RSRP gap between at least two reference signal resources within one group, or a RSRP gap between one reference signal and another reference closest to the one reference signal.

In some embodiments, the one or more scaling factors includes at least one of: a first scaling factor for a transmission spatial domain filter or a reference signal resource in one resource set or a reference signal resource in one resource setting, wherein the first scaling factor is used to scale a measured RSRP associated with one transmission spatial domain filter or a reference signal resource in one resource set or a reference signal resource in one resource setting, or a second scaling factor for a receive spatial filter, wherein the second scaling factor is used to scale a measured RSRP associated with the receive spatial domain filter.

In some embodiments, the one or more reporting criteria is applied or used per reference signal group to be reported. In some embodiments, the one or more reporting criteria is configured for one reporting configuration, for one or more resource sets, or for one or more CSI resource settings of the one reporting configuration. In some embodiments, the one or more reporting criteria are configured via a downlink control indicator (DCI), a medium access control-control element (MAC-CE) or a higher layer parameter.

In some embodiments, the exemplary methods further include determining RS indexes to be reported based on one or more subsets of one or more resource sets, where the one or more subsets of the one or more resource sets are dependent on the one or more reference signal resources that have been determined to be reported.

In some embodiments, the one or more subsets of one resource set is determined based on one or more reference signal resources to be reported. In some other embodiments, the one or more subsets of one or more resource sets are configured for one or more reference signal resources by the communication node.

In some embodiments, the one or more subsets of one resource set is determined based on any one of the following: (1) {k−1, k, k+1}, or {k−1, k, k+1} mod N, for each k, (2) {k−1−N1, k−N1, k+1−N1, k−1, k, k+1, k−1+N1, k+N1, k+1+N1}, or {k−1−N1, k−N1, k+1−N1, k−1, k, k+1, k−1+N1, k+N1, k+1+N1} mod N, for each k, (3) {k−N1, k−1, k, k+1, k+N1}, or {k−N1, k−1, k, k+1, k+N1} mod N, for each k, (4) {A+k}, or {A+k} mod N, for each k, (5) {A+k+B×N1}, or {A+k+B×N1} mod N, for each k, (6), {(k mod N1+A)mod N1+⌊k/N1⌋×N1+B×N1}, or {(k mod N1+A) mod N1+⌊k/N1⌋×N1+B×N1}mod N, for each k, where A is any one of elements from {−a1, −a1+1, . . . −1, 0, +1, . . . , a2} or any one of elements from subset of {−a1, −a1+1, . . . −1, 0, +1, . . . , a2}, B is any one of elements from {−b1, −b1+1, . . . −1, 0, +1, . . . , b2} or any one of elements from one subset of {−b1, −b1+1, . . . −1, 0, +1, . . . , b2}, k is a RS resource index to be reported, N is a number of reference signal resources of the one resource set, and N1, a1, a2, b1 and b2 are non-negative integers.

In some embodiments, one or more subsets of one resource set is based on values for N, N1, a1, a2, b1 or b2 transmitted by the communication node, where N, N1, a1, a2, b1 and b2 are non-negative integers.

In some embodiments, the one or more reference signal resources include any one or more of a synchronization signal block (SSB) and a channel state information reference signal (CSI-RS).

In another exemplary method, a wireless communication method includes providing, by a base station to a user equipment, a reporting configuration associated with one or more reporting criteria, the reporting configuration linked to one or more channel state information (CSI) resource settings that provide a configuration information to the user equipment, where each CSI resource setting includes one or more resource sets, and each resource set includes one or more reference signal resources. The another exemplary method also includes receiving the report, according to the one or more reporting criteria, the report that includes at least one of a reference signal receive power (RSRP), a rank indicator (RI), one or more reference signal indexes, and information about grouping the one or more reference signal indexes, where each reference signal index is associated with at least one of a CSI resource setting index, a reference signal resource set index, a reference signal resource index, and a reporting configuration index.

In yet another exemplary aspect, the above-described methods are embodied in the form of processor-executable code and stored in a computer-readable program medium.

In yet another exemplary embodiment, devices that are configured or operable to perform the above-described methods are disclosed.

The above and other aspects and their implementations are described in greater detail in the drawings, the descriptions, and the claims.

DETAILED DESCRIPTION

This patent document describes techniques that can improve wireless performance in a beamforming wireless environment. In some embodiments, a user equipment (UE) can generate a report based on a base station provided reporting configuration that is associated with one or more reporting criteria. This document will first briefly describe beamforming technology followed by four sections where several features and embodiments related to UE measurement reporting schemes are described. The example headings for the various sections below are used to facilitate the understanding of the disclosed subject matter and do not limit the scope of the claimed subject matter in any way. Accordingly, one or more features of one example section can be combined with one or more features of another example section.

For wireless systems that use a wide or ultra-wide spectrum resource (e.g., 20 MHz or greater), the propagation loss induced by the extremely high frequency becomes a noticeable challenge. To solve this problem, among others, antenna array and beamforming (BF) training technologies using Massive MIMO may be used to achieve beam alignment and to obtain a high antenna gain. As an example, a Massive MIMO can include 1024 antenna element for one node or a wireless communication equipment. To keep a low complexity and low cost of implementation while still benefitting from the antenna array, analog phase shifters become an attractive solution for implementing Millimeter Wave (mmWave) BF. The use of analog phase shifters can mean that the number of phases are finite and that constant modulus constraints are placed on the antenna elements. Given the pre-specified beam patterns, the variable-phase-shift-based BF training can target to generally identify the best pattern for subsequent data transmission.

Figure 1:
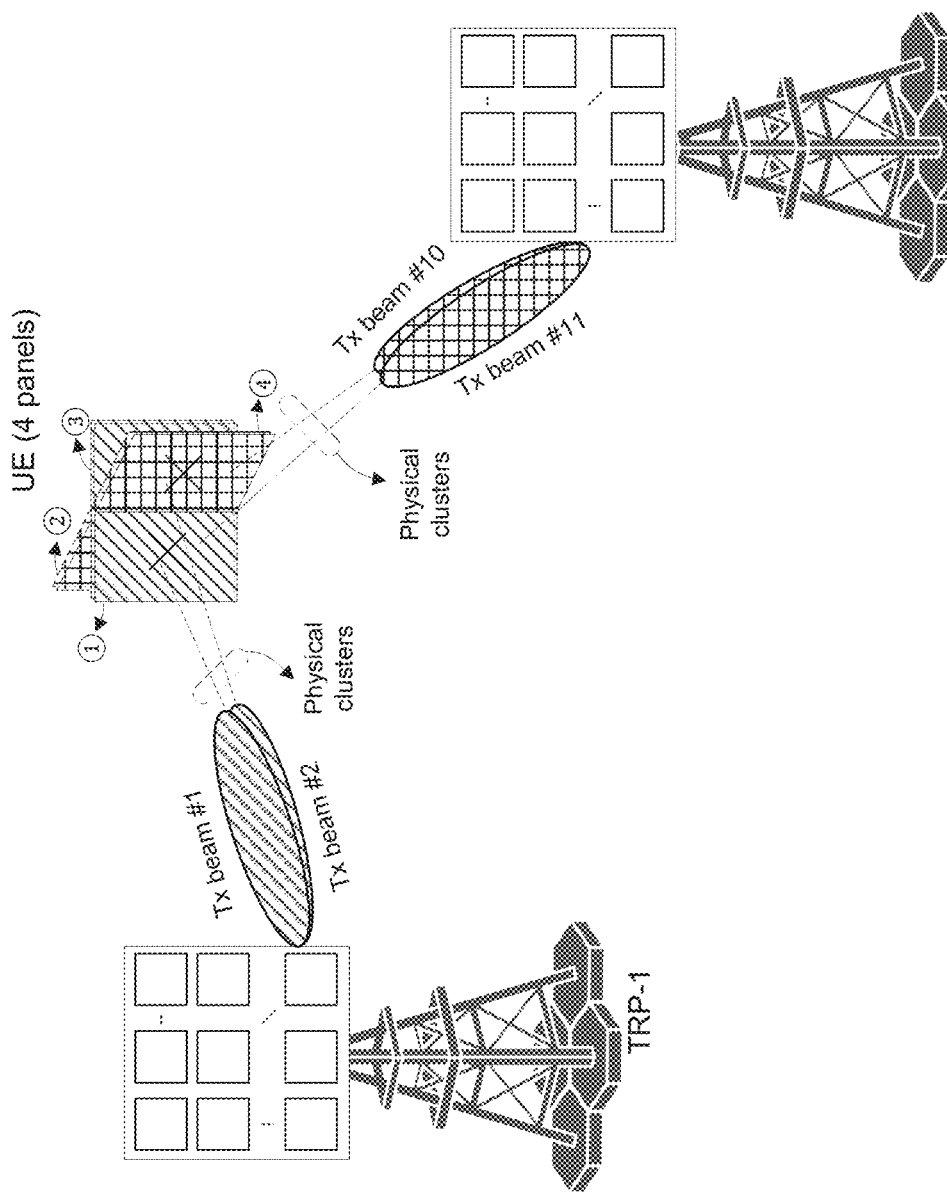
FIG. 1 shows an exemplary user equipment (UE) with four panels in a beamforming wireless environment.

FIG. 1 shows an exemplary UE with four panels in a beamforming wireless environment. The UE antenna panels 1 to 4 can be described using variables Mg and Ng, where Mg describes a number of panels in a column and Ng describes a number of panels in a row. In FIG. 1, the UE antenna panels can have Mg=1 and Ng=4, where angle between panels $\Theta_{mg,ng}$=90; $\Omega_{0,1}$=$\Omega_{0,0}$+90; $\Omega_{0,2}$=$\Omega_{0,0}$+180; $\Omega_{0,3}$=$\Omega_{0,0}$+270. Thus, in FIG. 1, the four panel UE has 1 column panel and four row panels, where each row panel is arranged 90 degrees from another row panel. The spacing between the UE panels in a horizontal direction (dgH) is 0 and the spacing between the panels in a vertical direction (dgV) is 0. Each base stations, or transmission reception point TRP, namely TRP-1 and TRP-2 has an array of column and row antenna panels that can also be described using the variables Mg and Ng.

Generally, the multi-TRP and multi-panel cases can be considered for a 5G base station (gNB) where multiple panels associated with a UE can cover a whole space for coverage. As one exemplary case, one panel for TRP and UE sides can have two transceiver units (TXRUs) that are associated with cross polarization accordingly. Therefore, in order to achieve a high RANK transmission, the TRP and UE may use different beams generated from different panels with the objective of sufficiently using capability of each panel, such as its associated TXRUs, or else the transmission performance may decline. For instance, referring to FIG. 1, if a UE with four panels reports received Tx beams, such as Tx beam #1 and Tx beam #2 (both of which can cover one main propagation path) with the objective of maximizing reference signal receive power (RSRP) cross all receive (Rx) panels, then a maximum number of supported RANK can be up to two. Similarly, if a UE only reports Tx beams associated with only one TRP panel, such as TRP-1 in FIG. 1, then a bottleneck or unexpected upper bound of spectral efficiency can also occur due to a limitation in the capability of the Tx-side.

Consequently, the concept of beam grouping to be reported by a UE is developed and can be further refined. For beam grouping, the beams which can be received simultaneously can be grouped into one group or the beams which cannot be received simultaneously can be grouped into one group. Beam grouping can briefly interpret the physical feature of gNB or UE multiple panels or TRPs. In addition, beams within one group can be further grouped into subgroup, where beam within one sub-group can be used for spatial multiplexing, or beam from different sub-groups can be used to achieve spatial multiplexing.

One approach for group based reporting has been adopted by 3GPP. The criteria for grouping involves the following two aspects from the perspective of the UE side. First, different Tx beams within one group can be simultaneously received, but Tx beams between different groups cannot be simultaneously received. Second, different Tx beams within one group cannot be simultaneously received, but Tx beams between different groups can be simultaneously received. In contrast, non-group based reporting involves a UE reporting the best-N beams per UE irrespective of UE panels.

Figure 2:
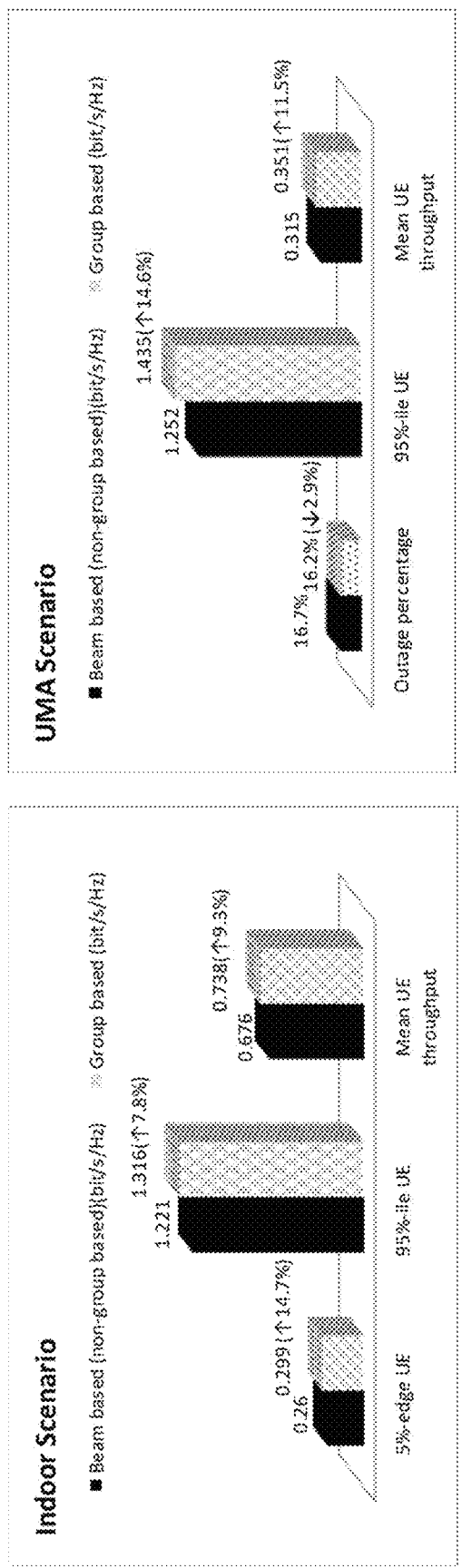
FIG. 2 shows a performance comparison between a group based and a non-group based reporting.

FIG. 2 shows a performance comparison between a group based and a non-group based reporting. FIG. 2 shows the performance gain in NR from group based beam reporting in the case of two panels in UE sides and two Tx beams to be reported which can be received simultaneously. The performance gain over non-group based beam reporting is from the natural filter, A, or called as natural penalty factor or scaling factor, of antenna element pattern. The function of antenna radiation pattern can be found in the following Table 1 where ($\theta''$,$\varphi''$) are in a local coordinate system in 3GPP TS 38.802.

Figure 3B:
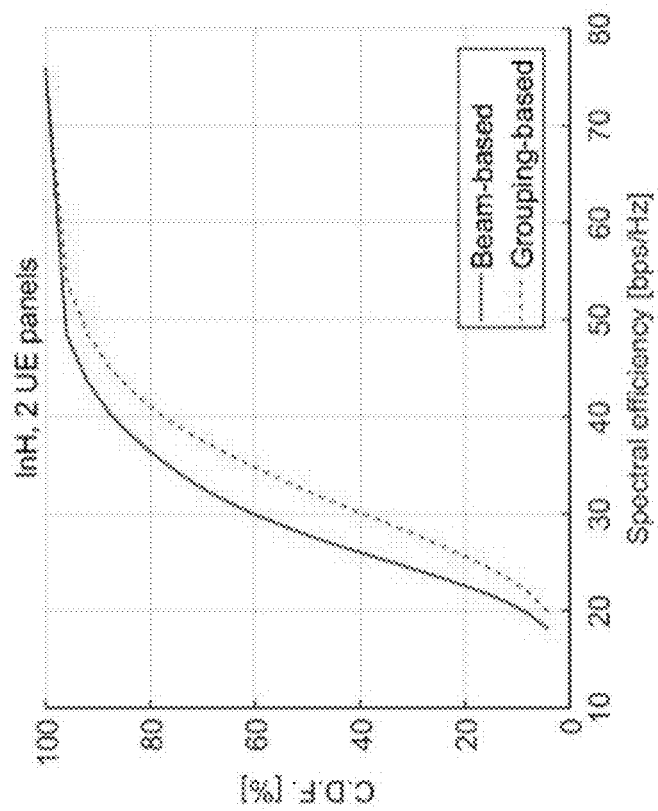
FIGS. 3A and 3B show simulation results for an exemplary embodiment of an indoor hotspot (InH) with 2 UE panels.
Figure 3A:
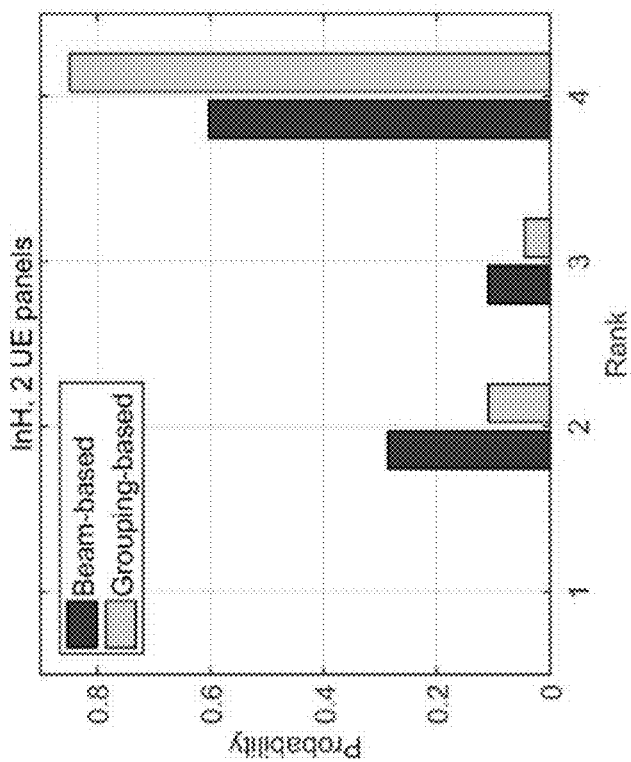
Figure 3D:
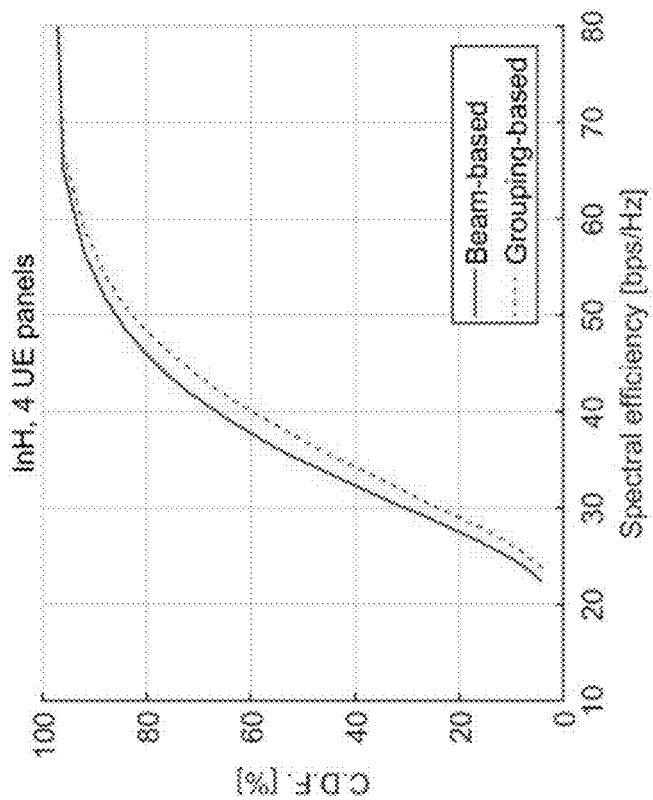
FIGS. 3C and 3D show simulation results for an exemplary embodiment of an InH with 4 UE panels.
Figure 3C:
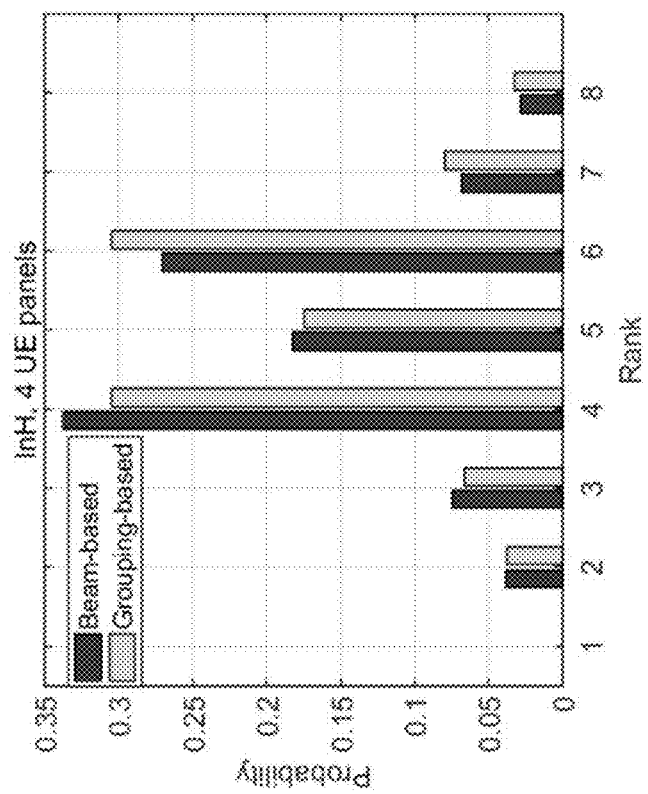

FIGS. 3A and 3B show simulation results for an indoor hotspot (InH) with 2 UE panels, and FIGS. 3C and 3D show simulation results for an indoor hotspot (InH) with 4 UE panels. By comparing FIGS. 3A to 3B with FIGS. 3C to 3D), some bottlenecks of group based beam reporting can be observed with the increase of UE panels. For instance, for 2 and 4 UE-panels, simulation results show that the gain of beam grouping declines as the UE panel number increases from 2 to 4.

3GPP New Radio (NR) Rel-15 supports the down-link (DL) beam management for a single DL transmission (Tx) beam single transmission reception point (TRP) cases, where group based and non-group based reporting have been adopted for beam related reports. The non-group based reporting can report the identities (IDs) of best-N Tx Reference signals (RS) that are measured with their corresponding RSRP results. However, the group based reporting can report one group or one set of two Tx beam ID(s), which can be received simultaneously. A group can refer to a receive beam set or only two Rx panels on a UE. Thus, group based reporting can be enhanced by supporting the reporting of multiple groups or multiple sets of Tx beam ID.

Because different panels can have different orientation, their boresight, or the direction of maximum gain, over physical propagation channel can be different. Thus, the group based reporting can be performed based on the orientations of the different panels so that low-correlation beam groups can be formed. Accordingly, a higher RANK transmission can be supported for system throughput. Compared with non-group based reporting, group based reporting can improve the system performance at least in terms of spectrum efficiency in the case of, for example, a two-panel UE architecture.

At least some or all of the following three technical problems can be solved by some embodiments when multi-beam or multi-TRP is considered. First, as described in the simulation results of FIGS. 3A and 3B, with the increase of UE panels the performance gain of group based reporting over non-group may not be distinct. With the objective of maximizing L1-RSRP, Tx-Rx beams generated by neighboring panels may point to the same physical paths or clusters with higher probability even when using group based reporting.

Second, the results of group based reporting may be beyond the capability of the gNB or TRPs, especially when taking into account a small cell scenario. In the case of multi-TRP or multi-panel, more than one Tx beams can be transmitted simultaneously from the perspective of TRP. For the different TRP, the maximum number of Tx beams that can be transmitted can be different. Thus, the benefits from beam grouping can be limited if a UE reports a number of

TABLE 1

| UE antenna radiation pattern model 1 | |
| --- | --- |
| Parameter | Values |
| Antenna element radiation pattern in $\theta''$ dim (dB) | $A_{E,V}(\theta'') = -\min\left[12\left(\frac{\theta''-90°}{\theta_{3dB}}\right)^2, SLA_V\right]$, $\theta_{3dB} = 90°$, $SLA_V = 25$ |
| Antenna element radiation pattern in $\varphi''$ dim (dB) | $A_{E,H}(\varphi'') = -\min\left[12\left(\frac{\varphi''}{\varphi_{3dB}}\right)^2, A_m\right]$, $\varphi_{3dB} = 90°$, $A_m = 25$ |
| Combining method for 3D antenna element pattern (dB) | $A''(\theta'', \varphi'') = -\min\{-[A_{E,V}(\theta'') + A_{E,H}(\varphi'')], A_m\}$ |
| Maximum directional gain of an antenna element $G_{E,max}$ | 5 dBi |

Tx beams to be simultaneously received that is more than the gNB or TRP's capability of simultaneously transmission.

Third, in the case of multiple TRP, the experienced propagation path from different TRPs can be different. From the perspective of system performance, these Tx beams can have a low intra-interference with the best Tx beam and can support the higher layer transmission. But with the objective of maximizing L1-RSRP, the beams from some certain TRP cannot satisfy the condition of best-N and are not reported.

In this patent document, the term beam can refer to a configuration of reference signaling, reference signal, spatial filter or precoding. The term Tx beam can refer to DL or uplink (UL) reference signaling, such as Channel State Information Reference Signal (CSI-RS), synchronization signaling block (SSB), demodulation reference signal (DMRS), Sounding Reference Signal (SRS), Tx spatial domain filter, or Tx precoding. The term Rx beam can refer to spatial domain filter, Rx spatial domain filter, or Rx precoding. Further, the term beam ID can refer to reference signaling index, spatial domain filter index or precoding index. The term group can refer to the UE reporting behavior of implicit representing of some DL RS IDs sharing the same or similar channel or reception properties, such as whether or not simultaneously received, quasi-co location, quasi-co beam, or spatial multiplexing. The terms set or sub-set can refer to the gNB configuration on DL RSs for beam management according to the same or similar transmission properties, such as whether or not simultaneously transmitted or a limited number.

I. Embodiment #1—Measurement and CSI Resource Setting for Multi-Panel or Multi-TRP To achieve the beam measurement, a resource configuration for multiple panels or multiple TRPs can be performed, where panel or TRP dedicated information can be distinguished through a resource set or a CSI resource setting. A resource set may include one or more DL RSs such as a synchronization signaling block (SSB) or a channel state information reference signal (CSI-RS). SSB is also called as synchronization signal (SS)/physical broadcast channel (PBCH) block (SS/PBCH). A CSI resource setting may include some common configuration information, such as timing behavior (e.g., periodic, aperiodic, semi-persistent) or bandwidth that can enable a UE to measure the DL RSs. In some embodiments, a resource set or a CSI resource setting can be associated with one TRP or one panel. From the perspective of gNB, in multi-panel or TRP cases, one or more resource sets, for example, 0~NTRP-1 resource sets, can be configured so that each resource set can correspond to one TRP or one panel and each resource set can include one or more DL RSs. The DL RSs within the set are generated from its associated TRP or panel.

Taking into account the TRP or panel's capability, the number of Tx beams which can be transmitted simultaneously can be limited, where Tx beams can be equivalent to the DL RSs. For instance, in a scenario where there are two TRPs in one cell, TRP-A can generate two different Tx beams simultaneously, but TRP-B can generate one Tx beam simultaneously in one time instance.

Therefore, as further described below, in some embodiments, the reporting configuration can include a criterion, for example, Nsimu_num_max, that can describe a maximum number of Tx beams to be transmitted simultaneously per resource set. In some embodiments, for the CSI or beam reporting perspective, Nsimu_num_max can be considered the upper bound of TRP or panel capability, but another criteria Nsimu_num, which can be defined by the number of Tx beams to be reported, can be configured for each set as one reporting restriction or constraint so that Nsimu_num can be less than Nsimu_num_max through gNB/TRP signaling configuration. Notice that, if only Nsimu_num_max is configured rather than Nsimu_num, the actual number for Tx beams to be reported can be assumed to be one UE implementation issue, where more flexibilities are achieved in UE sides.

II. Embodiment #2—Exemplary Framework for CSI Reporting

Figure 4A:
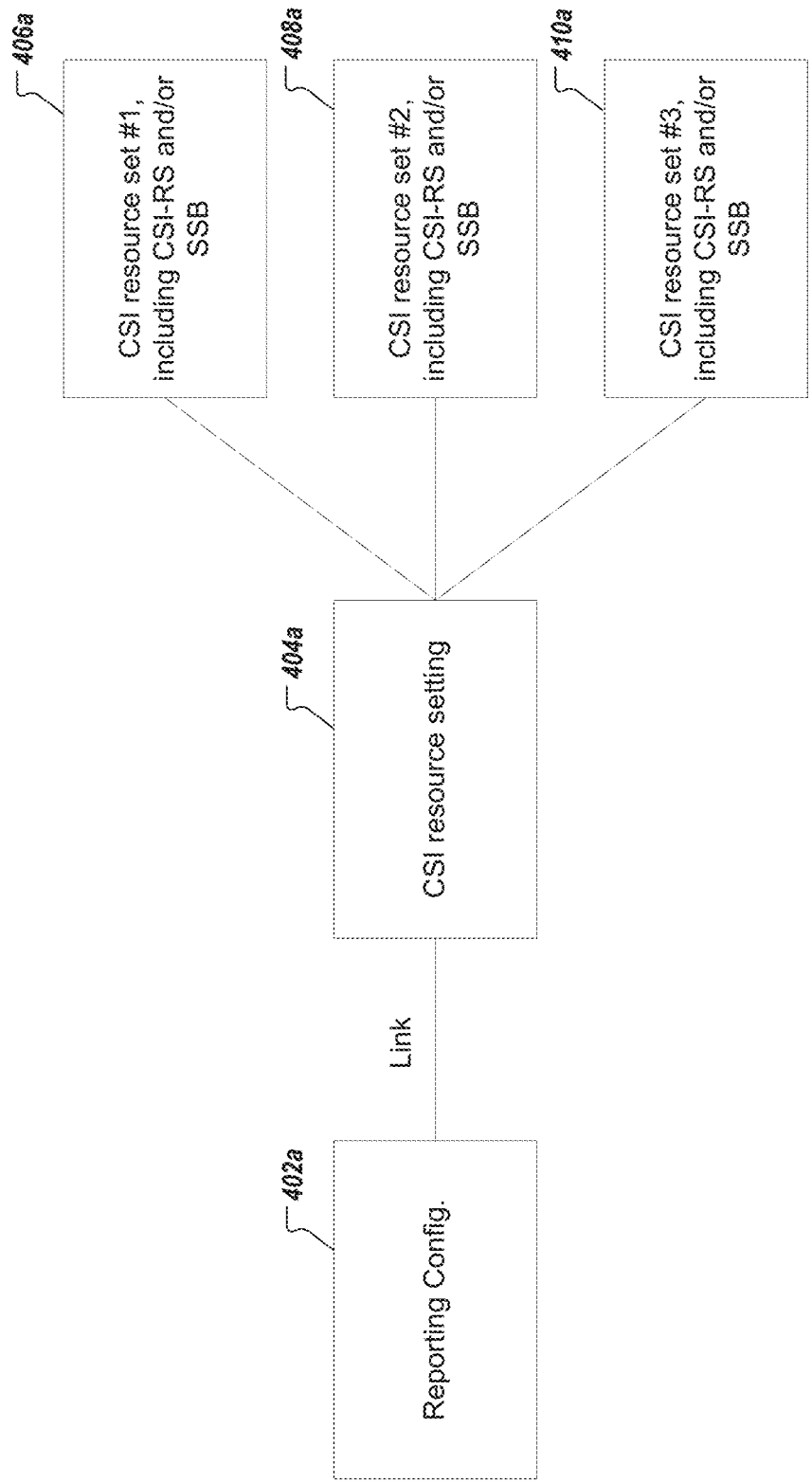
FIGS. 4A and 4B show two examples of reporting configuration for multiple TRPs or multiple panels.
Figure 4B:
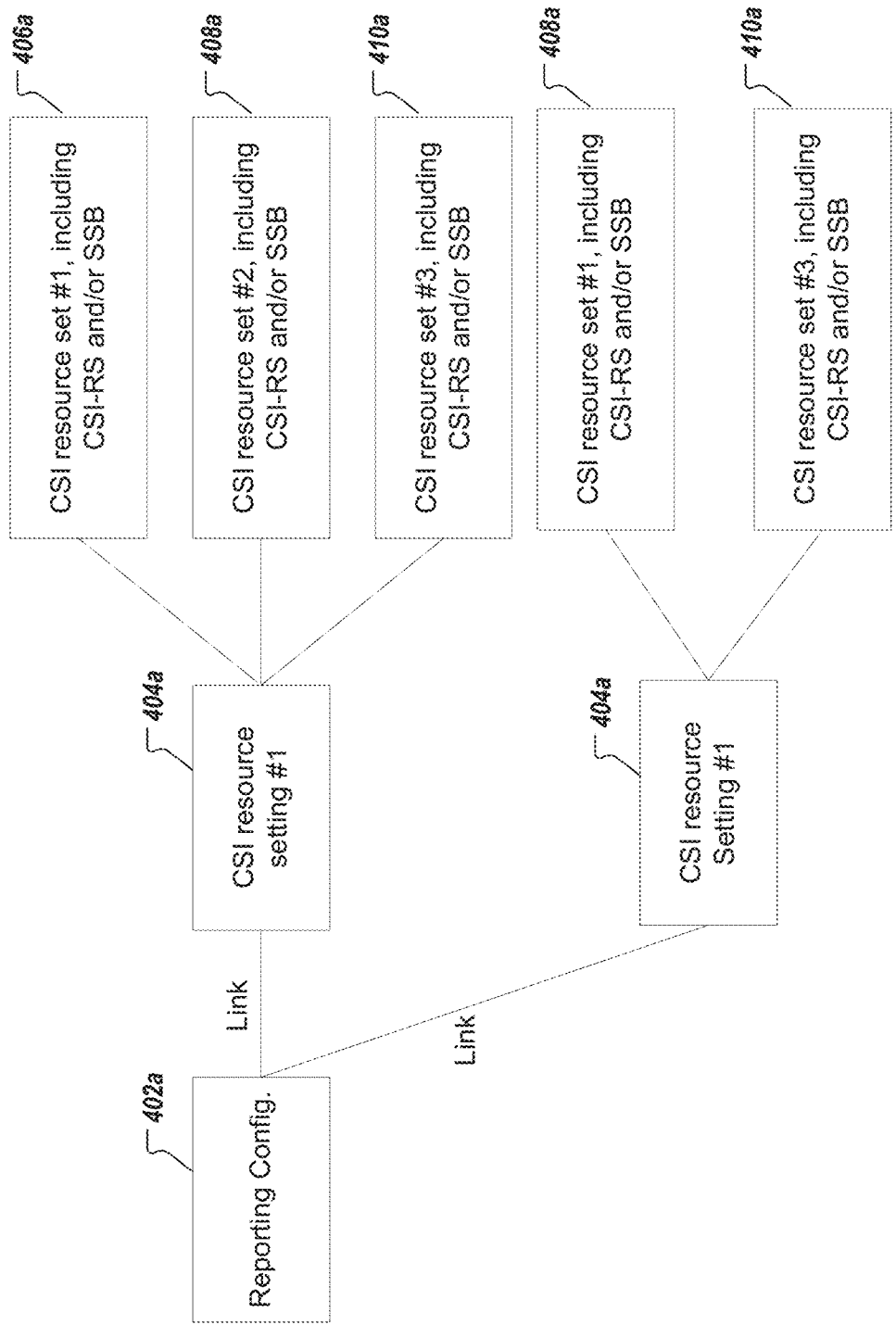

FIGS. 4A and 4B show two examples of reporting configuration for multiple TRPs or multiple panels. In some embodiments, as shown in FIG. 4A, a CSI reporting framework can include a reporting configuration 402a (also known as a reporting setting) that may be linked with one channel state information (CSI) resource setting 404a (also known as resource setting) that is associated with one or more CSI resource sets 406a-410a, (also called as resource set). Each resource set can include either CSI-RS or SSB or both CSI-RS and SSB. In this exemplary framework, the information about differentiating multi-TRP and multi-panel is represented by CSI resource set. Thus, in some embodiments, each CSI resource set is associated with each TRP that may have multiple antenna panels, or is associated with each antenna panel from the same or different TRPs. In some other embodiments, more than one resource sets can be configured for one TRP or one panel so that more than one set can be triggered for aperiodic beam reporting cross multiple slot. Thus, in some embodiments, a base station can provide to a UE a reporting configuration that is associated with one CSI resource setting that provide configuration information to the UE, where the one CSI resource setting identifies one or more resource sets, and each resource set included one or more reference signal resources.

FIG. 4B shows another exemplary framework where the reporting configuration is linked with one or more CSI resource setting. In such an exemplary framework, the reporting configuration can be linked with more than one CSI resource setting, where each CSI resource setting includes or identifies one or more CSI resource sets, and each CSI resource set includes a CSI-RS or SSB or both CSI-RS and SSB. In this framework, the information about TRP can be differentiated from CSI resource setting, and then the information about panel per TRP can be differentiated from the CSI resource set per CSI resource setting. Thus, in some embodiments, a base station can provide to a UE a reporting configuration that is associated with one or more CSI resource settings that provide configuration information to the UE, where each CSI resource setting identifies one or more resource sets, and each resource set included one or more reference signal resources.

After the UE performs its measurement and generates a report, the UE sends or reports to the gNB the generated report associated with or linked to the CSI resource setting. In some embodiments, the report generated by the UE can include at least one of the following for beam management: CSI-RS Resource Index (CRI), CSI-RS resource set identifier (ID), CSI-RS resource setting ID, reporting configuration ID, a SSB resource indicator, RSRP, rank indicator (RI), one or more reference signal indexes, and information about grouping the one or more reference signal indexes. In some embodiments, each reference signal index is associated with any one or more of a CSI resource setting index, a reference signal resource set index, a reference signal resource index, and a reporting configuration index.

III. Embodiment #3—Reporting Configuration or Reporting Setting

In some embodiments, one or more criteria of beam reporting setting or reporting configuration can be configured by a base station or pre-defined for beam reporting. Some of the reporting criteria listed below in numbers 1 to 8 are examples of the one or more reporting criteria. The one or more reporting criteria can be configured for one reporting configuration or the one or more reporting criteria can be configured or pre-defined for one or more CSI resource settings associated with the one reporting configuration, where the one or more reporting criteria can be used together for all CSI resource setting or all resource set, or the one or more reporting criteria is separately configured per CSI resource setting or per resource set. In some embodiments, the one or more reporting configuration can be configured for one or more resource sets. One benefit of configuring a reporting configuration is that the information provided by a UE based on the reporting configuration can be used by the base station to handle the issues introduced by the multiple TRP and multiple panel. In some embodiments, a UE can be configured to provide a report based on one or more reporting criteria that can be configured and transmitted by a base station to a UE using a radio resource control (RRC) higher layer parameter, a medium access control-control element (MAC-CE) signaling, or a downlink control information (DCI).

1. Linkage or Mapping Between Reporting Configuration and Resource Setting

In some embodiments, a gNB can configure the reporting configuration to be associated with one or more CSI resource setting, where the gNB can configure each CSI resource setting to be associated with one or more one CSI resource set. A reporting criterion can include at least one of a number of resource sets from one CSI resource setting to be reported, a minimum number of resource sets from one CSI resource setting to be reported, or a maximum number of resource sets from one CSI resource setting to be reported.

2. Criteria of Grouping and/or a Number of Groups or a Number of Beams within Group In some embodiments, one or more criteria are used to group one or more reference signal resources. The one or more reference signal resources can be grouped to form one or more reference signal groups to be reported. For instance, one or more reference signal indexes can be grouped to form one or more reference signal groups to be reported. One criteria for grouping reference signal indexes may include at least one of a number of groups to be reported, a number of beam (or reference signal indexes) per group to be reported, or a number of beam (or reference signal indexes) per sub-group to be reported, where one "beam" can be equivalent to one reference signal index. For instance, gNB configures one or more of the following grouping approaches as one criteria for the associated reporting. First, different Tx beams within one group can be simultaneously received, but Tx beams between different groups cannot be simultaneously received. Second, different Tx beams within one group cannot be simultaneously received, but Tx beams between different groups can be simultaneously received. Third, different Tx beams for the same sub-group can be spatially multiplexed, but Tx beams from different groups cannot be spatially multiplexed. Fourth, different Tx beams for the different sub-group and same group can be spatially multiplexed, where different Tx beams for the same sub-group and same group may not be possible to be spatially multiplexed. Fifth, different Tx beams for different group and same sub-group can be spatially multiplexed, where different Tx beams for the same group and same sub-group may not be possible to be spatially multiplexed but these different Tx beams can be received simultaneously at the UE.

In some embodiments, the one or more reporting criteria can be provided by a base station and applied or used by a user equipment per reference signal group to be reported.

3. Maximum RSRP Gap of Intergroups or Intra-Groups TRSRP or Relative Gap with Closed to the RSRP to be Reported Another criterion for grouping can include at least one of a maximum RSRP gap between at least two groups (or RSRP gap of inter-groups), or a maximum RSRP gap between at least two reference signal resources within one group (or intra-group TRSRP), or a maximum RSRP gap between the respective reference signal resources associated with at least two groups, or a relative RSRP gap to be reported between the RSRPs of one reference signal resource that is closest to another reference signal resource. As an example, in a scenario where there are three beams to be reported, and the RSRP of the first best beam is −70 dB, the RSRP of second best beam is −80 dB, then the relative gap can be between a third best beam and the closest RSRP, e.g., the second best beam with RSRP of −80 dB rather than −70 dB. In some embodiments, the maximum RSRP of a group may not be TRSRP lower than the best group with the objective of maximizing RSRP. The RSRP of beam within one group may not be TRSRP lower than its best beam with the objective of maximizing RSRP;

4. Maximum Number Nsimu_max of Tx Beam to be Reporting for One Resource Set or One Resource Setting In some embodiments, one reporting criteria can include a number of maximum simultaneous Tx beam, up to Nsimu_max to be reporting for one resource set or CSI resource setting. In some embodiments, a number of Tx beams to be reporting for one resource set or for one resource setting within one reported group or within all reported groups can be no more than Nsimu_max, which can be depended on the capability of a TRP or gNB to simultaneously transmit Tx beams.

Nsimu_max can be configured by gNB or pre-defined. In some embodiments where Nsimu_max is configured, the Nsimu_max can be included by the gNB in the reporting configuration signal or as one constraint configured in a resource set or a resource setting. In some embodiments where Nsimu_max is pre-defined, Nsimu_max can be, for example, one or two.

On the UE side, in some embodiments, the UE can assume that up to Nsimu_max Tx beams can be selected within one group, if the criteria of group based reporting is that different Tx beams within one group can be simultaneously received, but Tx beams between different groups cannot be simultaneously received. In some other embodiments, the UE can assume that up to Nsimu_max Tx beams can be selected for all groups where Nsimu_max is one or two, if the criteria of group based reporting is different Tx beams within one group cannot be simultaneously received, but Tx beams between different groups can be simultaneously received.

5. Alpha: Penalty Factor or Scaling Factor for Rx Beam in the Case of UE Multi-Panel In some embodiments, one reporting criteria can include a penalty factor, also known as a scaling factor for a Rx beam. As a function of Rx beam orientation, also known as arrival of angle, Alpha can be configured by gNB per cell, per UE or per beam group, to impact L1-RSRP determination according to different Rx beam orientation. Thus, the Alpha scaling factor can be used to scale one or more measured RSRPs of one or more receive beams.

In some embodiments, rather than using the measured L1-RSRP, the L1-RSRP can be scaled by the UE for beam determination using Alpha. Thus, as an example, the UE can select the best Tx beams according to the scaled RSRP. For instance, the following formulas for Alpha $\alpha(\theta'')$ can be used where $\theta''$ denotes angle of arrival.

$$A_{E,V}(\theta) * 1 \Rightarrow A_{E,V}(\theta) * \alpha(\theta)$$

$$\text{e.g., } \alpha(\theta) = -\min\left[12\left(\frac{\theta - 90^0}{\theta_{3dB}}\right)^2, SLA_V\right], \theta_{3dB} = 45^0, SLA_V = 25$$

$$\text{s.t. } A_{E,V}(\theta) = -\min\left[12\left(\frac{\theta - 90^0}{\theta_{3dB}}\right)^2, SLA_V\right], \theta_{3dB} = 90^0, SLA_V = 25$$

Figure 5A:
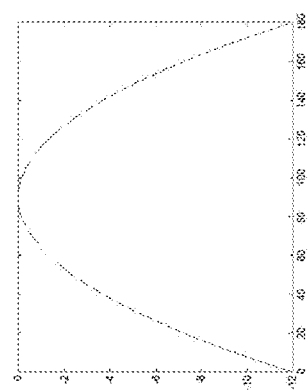
FIGS. 5A to 5C show examples of antenna gain as function of arrival of angle for the perspective of beam determination.
Figure 5B:
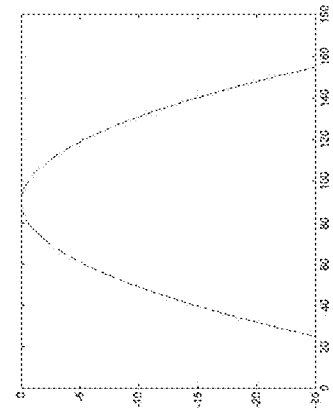
Figure 5C:
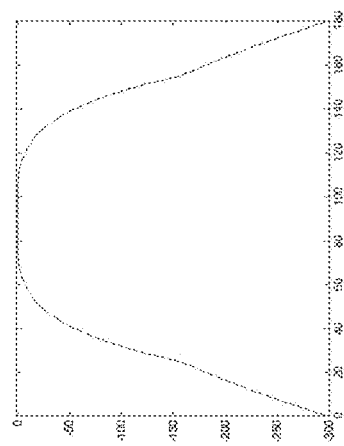

FIGS. 5A to 5C show examples of antenna gain as function of arrival of angle for the perspective of beam determination. FIG. 5A shown an Antenna gain A_{E,V}, which is introduced by one physical antenna pattern according to 3GPP TS 38.802:

$$A_{E,V}(\theta) = -\min\left[12\left(\frac{\theta - 90^0}{\theta_{3dB}}\right)^2, SLA_V\right], \theta_{3dB} = 90^0, SLA_V = 25.$$

FIG. 5B shows an antenna gain with a penalty factor of alpha(theta), where we have $$\alpha(\theta) = -\min\left[12\left(\frac{\theta - 90^0}{\theta_{3dB}}\right)^2, SLA_V\right], \theta_{3dB} = 45^0, SLA_V = 25.$$

In comparison of the real antenna gain over vertical angular, the observation more focusing on the 60~120 degree can be achieved according to the recommended approach with penalty factor of A_{E,V}*alpha(theta). Therefore, for the perspective of beam determination, the antenna gain is changed from A_{E,V} into A_{E,V}*alpha(theta) as shown in the FIG. 5C.

Additionally, the following formulas for Alpha $\alpha(\theta'')$ can be used in dB unit where $\theta''$ denotes angle of arrival.

$$A_{E,V}(\theta) * 0 \Rightarrow A_{E,V}(\theta) * \alpha(\theta)$$

$$\text{e.g., } \alpha(\theta) = -\min\left[12\left(\frac{\theta - 90^0}{\theta_{3dB}}\right)^2, SLA_V\right], \theta_{3dB} = 45^0, SLA_V = 25$$

$$\text{s.t. } A_{E,V}(\theta) = -\min\left[12\left(\frac{\theta - 90^0}{\theta_{3dB}}\right)^2, SLA_V\right], \theta_{3dB} = 90^0, SLA_V = 25$$

In beam determination, the following RSRP in dB can be used after scaling according to the latter approach of introducing of alpha, where B denotes the index of Tx beam and $\theta_B$ denotes the orientation of Rx beam corresponding to the Tx beam.

$$RSRP_{sending}(B) = RSRP_{meas}(B) - 2*\alpha(\theta_B)$$

6. Beta: Penalty Factor or Scaling Factor for Tx Beam in the Case of gNB Multi-Panel or TRP.

In some embodiments, one reporting criteria can include a penalty factor, also known as a scaling factor for a Tx beam or a reference signal resource in one resource set or a reference signal resource in one resource setting. Once the Tx beam of the resource set-A is selected, the measured L1-RSRP of other Tx beam from the resource set-A can be scaled by Beta for the perspective of beam determination for all reports, or beam determination of beam group to be reported. Thus, the Beta scaling factor can be used to scale one or more measured RSRPs of one or more transmit beams or reference signal resources.

An example is shown in the equation below where two resource sets are configured for gNB. The two resource sets are represented by set-Z1 and set-Z2. With the objective of maximizing RSRP, the best RSRP associated with one RS from one of set-Z1 and set-Z2 can be represented as XL. If X1 belongs to one of the two sets, RSRP for each element of the associated set can be subtracted by Beta. Then, by going back, the current best beams can be selected according to scaled RSRP except X1.

Loop-B (within one group)
X1=argmax L1-RSRP (set-Z1, set-Z2)
L1-RSRP(Z1)=L1-RSRP(Z1)–Beta, for each element of set Z1, and remove X1 from set-Z1, if X1 belongs to Z1
L1-RSRP(Z2)=L1-RSRP(Z2)–Beta, for each element of set Z2, and remove X1 from set-Z2, if X1 belongs to Z2
Go Loop-B In some embodiments, beta can be predefined, such as 5 dB. In some other embodiments, beta can be configured by gNB per cell, per UE or per resource set.

7. NBeta_min and NBeta for One Resource Set or CSI Resource Setting

In some embodiments, a number of Tx beams (or a number of reference signals), NBeta to be reported for one resource set or for one resource setting within one reported group or within all reported groups can be no less than NBeta_min Tx beams, which can guarantee at least NBeta_min Tx beam to be reported per group. Thus, in some embodiments, one reporting constraint can include a minimum number of RS resources that can describe NBeta_min, from one resource set or from one CSI resource setting to be reported. Further, in some embodiments, another reporting constraint can include a maximum number of RS resources that can describe up to NSimu_max resources from one resource set or from one CSI resource setting to be reported.

NBeta_min or NBeta can be configured by gNB or pre-defined. In some embodiments where NBeta_min or NBeta is configured, the NBeta_min or NBeta is included in the reporting configuration signal or as one constraint configured in resource set or resource setting. In some embodiments where NBeta_min or NBeta is pre-defined, NBeta_min can be, for example, one, or NBeta can be, for example, two.

8. NGamma_max for One Subset of One Resource Set

In some embodiments, a number of Tx beam to be reported for one subset, according to an implicit or default rule, that may not be more than a reporting criterion of NGamma_max. In some embodiments, NGamma_max may describe a maximum number of RS resources to be reported for one or more subsets of one resource set. In some other embodiments, as an example, NGamma_max may be 1, to describe one RS resource. The implicit rule for generating one or more subsets of one resource set may include at least one of the rules shown below, where k, N, N1, N2 denote the location or local index of the Tx beams or reference signal resources within one resource set to be reported, a number of RSs of one resource set, a range of horizontal-domain DL RSs, and a range of vertical-domain DL RSs, respectively. It is assumed that the ID of DL RS is from 0 to N−1:

{k−1, k, k+1}, or {k−1, k, k+1} mod N, for each k;

{k−1−N1, k−N1, k+1−N1, k−1, k, k+1, k−1+N1, k+N1, k+1+N1}, or {k−1−N1, k−N1, k+1−N1, k−1, k, k+1, k−1+N1, k+N1, k+1+N1} mod N, for each k;

{k−N1, k−1, k, k+1, k+N1}, or {k−N1, k−1, k, k+1, k+N1} mod N, for each k;

{k−1−N2, k−N2, k+1−N2, k−1, k, k+1, k−1+N2, k+N2, k+1+N2} mod N, for each k;

{k−N2, k−1, k, k+1, k+N2} mod N, for each k;

Additionally, the following one general example can be used for generating subset of each resource set to be generated by {A+k}, {A+k}mod N, {A+k+B×N1}, {A+k+B×N1}mod N, {(k mod N1+A)mod N1+⌊k/N1⌋×N1+B×N1}, or {(k mod N1+A)mod N1+⌊k/N1⌋×N1+B×N1}mod N, for each k, where A is any one of elements from {−a, −a+1, . . . −1, 0, +1, . . . , a} or any one of elements from subset of {−a, −a+1, . . . −1, 0, +1, . . . , a}, and B is any one of elements from {−b, −b+1, . . . −1, 0, +1, . . . , b} or any one of elements from subset of {−b, −b+1, . . . −1, 0, +1, . . . , b}, where k is the reference signal resource index to be reported, N is a non-negative integer and can describe a number of reference signal resources of one resource set, N1 is a non-negative integer and can describe a range of reference signal resources in one domain, and a and b are non-negative integers. In additionally, the range of A or B is determined by the value of B or A to be selected.

In some embodiments, the subset of {−a, −a+1, . . . −1, 0, +1, . . . , a} is determined by the value of which b is selected from {−b, −b+1, . . . −1, 0, +1, . . . , b}. For instance, in the case of subset of each resource set to be generated by {A+k+B×N1}mod N, B={−2, −1, 0, 1, 2}, and then we have A={0} for B=−2 or 2; A={−1, 0, 1} for B=−1 or 1; or A={−2, −1, 0, 1, 2} for B=0, where b=2 and a=2. Additionally, in some embodiment, A can be any one of elements from {−a1, −a1+1, . . . −1, 0, +1, . . . , a2} or any one of elements from subset of {−a1, −a1+1, . . . −1, 0, +1, . . . , a2}, B can be any one of elements from {−b1, −b1+1, . . . −1, 0, +1, . . . , b2} or any one of elements from one subset of {−b1, −b1+1, . . . −1, 0, +1, . . . , b2}, where a1, a2, b1 and b2 are non-negative integers.

In some embodiments, values for N, N1, a, b, (or a1, a2, b1 and b2) and N2 can be indicated to UE by gNB.

In some embodiments, determining RS indexes to be reported is based on one or more subsets of one or more resource sets, where the one or more subsets of one or more resource sets can depend on the RS resources that have been determined to be reported, e.g., k. For instance, a UE selects the first RS (e.g. by the best RSRP) from one or more lists (or pools) of RSs, e.g., one or more resource sets. Based on the first selected RS and the criteria depending on the selected RS, e.g., according to the subset generated by {A+k+B×N1}mod N, UE can updates the list by removing some RSs, e.g., with indexes of {A+k+B×N1}mod N, from one list, e.g., one resource set, associated with the first selected RS; then, UE selects the 2nd RS (e.g. by the best RSRP) from the updated lists. Based on the 2nd selected RS and the criteria depending on the selected RS, the UE can update the list by removing some RSs from one associated list accordingly, etc. Thus, in some embodiments, one or more subsets of one or more resource sets can be determined based on a number of RS resources to be reported. In some other embodiments, one or more subsets of one or more resource sets can be configured for a number of RS resources by the communication node.

Figure 6:
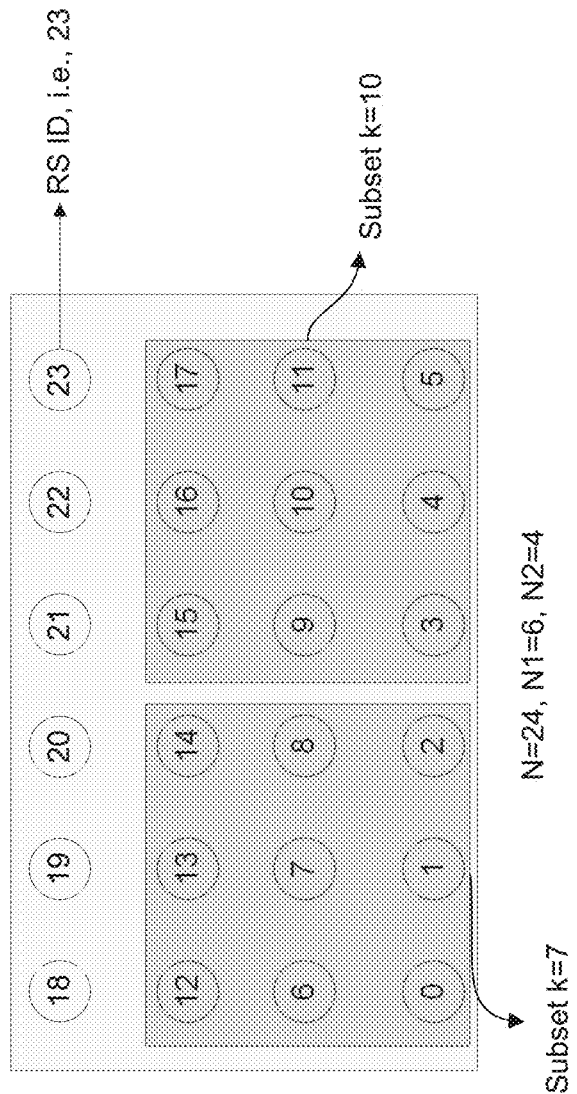
FIG. 6 shows an example of subsets of one resource set according to one implicit rule.

FIG. 6 shows an example of subsets of one resource set according to one implicit rule.

IV. Embodiment #4—Beam Determinations for Non-Group Based Reporting

In non-group based reporting, gNB can configure the reporting configuration by disabling group based reporting. One reporting configuration can include one RS setting which can include multiple RS set. As constraints for non-group based reporting, the following aspects or the portion of the following may be configured by a gNB or predefined in a specification:

Maximum number of Tx beam to be reporting for each resource set $N_{simu\_max}$, e.g., 2

Alpha $\alpha(\theta'')$ e.g $\theta_{3\ dB}=45°$

Beta, e.g., 5 dB

Minimum number of Tx beam to be reported for each set $N_{Beta\_min}$, e.g., 1

Maximum number for one subset of each resource set $N_{Gamma\_max}$, e.g., 1

The above parameter also can be configured per resource set. Further, in some embodiments, a same parameter associated with two or more sets can have the same value.

According to above constraint, beam reporting {x1, . . . , xN} can be reported by a UE to a gNB according to UE measurement, where xk represent the index of DL RS to be measured for beam management

V. Embodiment #5—Beam Determinations for Group Based Reporting

Currently, two criteria of beam grouping involve the following aspects from the perspective of UE side. First, different Tx beams within one group can be simultaneously received, but Tx beams between different groups cannot be simultaneously received. Second, different Tx beams within one group cannot be simultaneously received, but Tx beams between different groups can be simultaneously received.

The two grouping criterion are discussed respectively.

Regarding the Alt-1 grouping, the grouping rule is summarized as below. a) Different Tx beam within one group can be received simultaneously, and b) different Tx beam from different group cannot be received simultaneously.

As constraints for group based reporting, the following aspects or the portion of the following are configured:

Criteria of grouping approach, e.g., Alt-1

The number of groups to be reported, e.g., J

The number of beam per group to be reported, e.g., N

Maximum RSRP gap of inter-group $T_{RSRP}=5$ dB

Maximum number of Tx beam to be reporting for each resource set $N_{simu\_max}$, e.g., 2

Alpha $\alpha(\theta'')$ e.g $\theta_{3\ dB}=45°$

Beta, e.g., 5 dB

Minimum number of Tx beam to be reported for one set $N_{Beta\_min}$, e.g., 1

Maximum number for one subset of each resource set $N_{Gamma\_max}$, e.g., 1

The above parameter also can be configured per resource set. Further, in some embodiments, a same parameter associated with two or more sets can have the same value.

According to above reporting constraint, the following contents of beam reporting are reported to gNB according to UE measurement, where xk represent the index of DL RS to be measured for beam management:

Reported group-1 $\{x_{1\_1}, x_{1\_2}, x_{1\_3}, \ldots, x_{1\_N}\}$;
Reported group-2 $\{x_{2\_1}, x_{2\_2}, x_{2\_3}, \ldots, x_{2\_N}\}$;
...
Reported group-J $\{x_{J\_1}, x_{J\_2}, x_{J\_3}, \ldots, x_{J\_N}\}$.

Regarding the Alt-1 grouping, the grouping rule is summarized as below. a) Different Tx beam within one group cannot be received simultaneously, b) different Tx beam from different group can be received simultaneously.

As constraints for non-group based reporting, the following aspects or the portion of the following are configured:

Criteria of grouping approach, e.g., Alt-2
The number of groups to be reported, e.g., J
The number of beam per group to be reported, e.g., N
Maximum RSRP gap of intra-group $T_{RSRP}=15$ dB
Maximum number of Tx beam to be reporting for each resource set $N_{simu\_max}$, e.g., 2
Alpha $\alpha(\theta'')$ e.g., $\theta_{3\ dB}=45°$
Beta, e.g., 5 dB
Minimum number of Tx beam to be reported for one resource set $N_{Beta\_min}$, e.g., 1
Maximum number for one subset of each resource set $N_{Gamma\_max}$, e.g., 1

The above parameter also can be configured per resource set. Further, in some embodiments, a same parameter associated with two or more sets can have the same value.

According to above constraint, the following contents of beam reporting are reported to gNB according to UE measurement, where xk represent the index of DL RS to be measured for beam management:

Reported group-1 $\{x_{1\_1}, x_{1\_2}, x_{1\_3}, \ldots, x_{1\_N}\}$;
Reported group-2 $\{x_{2\_1}, x_{2\_2}, x_{2\_3}, \ldots, x_{2\_N}\}$;
...
Reported group-J $\{x_{J\_1}, x_{J\_2}, x_{J\_3}, \ldots, x_{J\_N}\}$.

Figure 7:
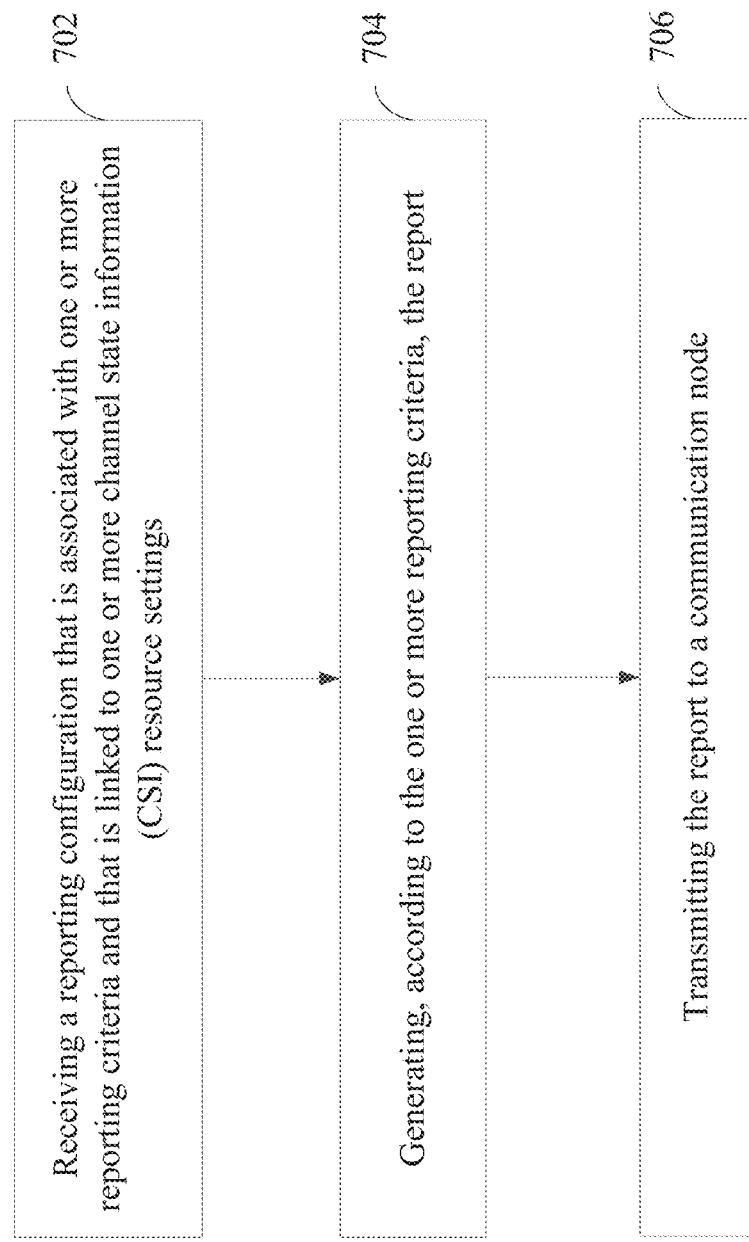
FIG. 7 shows exemplary flowchart implemented at a user equipment to generate a report based on one or more reporting criteria.

FIG. 7 shows exemplary flowchart implemented at a user equipment to generate a report based on one or more reporting criteria. At the receiving operation 702, a user equipment receives a reporting configuration associated with one or more reporting criteria. The reporting configuration is linked to one or more channel state information (CSI) resource settings that provide configuration information. Each CSI resource setting can identify one or more resource sets, and each resource set can include one or more reference signal resources. The one or more reference signal resources can include any one or more of a synchronization signal block (SSB) and a channel state information reference signal (CSI-RS).

At the generating operation 704, the user equipment generates, according to the one or more reporting criteria, the report that includes at least one of a reference signal receive power (RSRP), a rank indicator (RI), one or more reference signal indexes, and information about grouping the one or more reference signal indexes. Each reference signal index can be associated with at least one of a CSI resource setting index, a reference signal resource set index, a reference signal resource index, and a reporting configuration index.

At the transmitting operation 706, the user equipment transmits the report to a communication node, such as a gNB.

With respect to FIG. 7 and FIG. 8, as further described below, the following features may be practiced. In some embodiments, the one or more reporting criteria includes at least one of (1) one or more criteria for grouping one or more reference signal indexes to be reported, where the one or more reference signal indexes are grouped into one or more reference signal groups, (2) a number of reference signal (RS) resources from one resource set or from one CSI resource setting to be reported, (3) a minimum number of RS resources from one resource set or from one CSI resource setting to be reported, (4) a maximum number of RS resources from one resource set or from one CSI resource setting to be reported, (5) a number of resource sets from one CSI resource setting to be reported, (6) a minimum number of resource sets from one CSI resource setting to be reported, (7) a maximum number of resource sets from one CSI resource setting to be reported, (8) a maximum number of RS resources or one RS resource to be reported for one or more subsets of one resource set, or (9) one or more scaling factors to scale one or more measured RSRPs associated with one or more reference signal indexes or associated with one or more transmission or receive spatial domain filters. In some embodiments, one of the criteria for grouping reference signal indexes can include at least one of a number of groups to be reported, a number of reference signal indexes per group to be reported, or a number of reference signal indexes per sub-group to be reported. In some embodiments, one of the criteria for grouping can include at least one of a maximum RSRP gap between at least two groups, a maximum RSRP gap between the respective reference signal resources associated with at least two groups, a maximum RSRP gap between at least two reference signal resources within one group, or a RSRP gap between one reference signal and another reference closest to the one reference signal.

In some embodiments, RS indexes can be determined to be reported based on one or more subsets of one or more resource sets, where the one or more subsets of the one or more resource sets can depend on the one or more reference signal resources that have been determined to be reported.

In some embodiments, the one or more reporting criteria can be applied or used per reference signal group to be reported. In some embodiments, the one or more reporting criteria can be configured for one reporting configuration, for one or more resource sets, or for one or more CSI resource settings of the one reporting configuration. In some embodiments, the one or more reporting criteria can be configured via a downlink control indicator (DCI), a medium access control-control element (MAC-CE) or a higher layer parameter transmitted by a communication node, such as a gNB.

In some embodiments, the one or more scaling factors includes at least one of: (1) a first scaling factor for a transmission spatial domain filter or a reference signal resource in one resource set or a reference signal resource in one resource setting, where the first scaling factor is used to scale a measured RSRP associated with one transmission spatial domain filter or a reference signal resource in one resource set or a reference signal resource in one resource setting, and (2) a second scaling factor for a receive spatial filter, where the second scaling factor is used to scale a measured RSRP associated with the receive spatial domain filter.

In some embodiments, a UE can determine RS indexes to report based on one or more subsets of one or more resource sets. The one or more subsets of one or more resource sets can depend on the one or more reference signal resources that have been determined to be reported. In some embodiments, the one or more subsets of one resource set can be determined based on one or more reference signal resources to be reported. In some other embodiments, the one or more subsets of one or more resource sets are configured for one or more reference signal resources by the communication node.

In some embodiments, one or more subsets of one resource set can be determined based on any one of the following: (1) {k−1, k, k+1}, or {k−1, k, k+1} mod N, for each k, (2) {k−1−N1, k−N1, k+1−N1, k−1, k, k+1, k−1+N1, k+N1, k+1+N1}, or {k−1−N1, k−N1, k+1−N1, k−1, k, k+1, k−1+N1, k+N1, k+1+N1} mod N, for each k, (3) {k−N1, k−1, k, k+1, k+N1}, or {k−N1, k−1, k, k+1, k+N1} mod N, for each k, (4) {A+k}, or {A+k}mod N, for each k, (5) {A+k+B×N1}, or {A+k+B×N1}mod N, for each k, (6) {(k mod N1+A)mod N1+⌊k/N1⌋×N1+B×N1}, or {(k mod N1+A)mod N1+⌊k/N1⌋×N1+B×N1}mod N, for each k, where A is any one of elements from {−a1, −a1+1, . . . −1, 0, +1, . . . , a2} or any one of elements from subset of {−a1, −a1+1, . . . −1, 0, +1, . . . , a2}, B is any one of elements from {−b1, −b1+1, . . . −1, 0, +1, . . . , b2} or any one of elements from one subset of {−b1, −b1+1, . . . −1, 0, +1, . . . , b2}, k is a RS resource index to be reported, N is a number of reference signal resources of the one resource set, and N1, a1, a2, b1 and b2 are non-negative integers. In some embodiments, one or more subsets of one resource set can be based on values for N, N1, a1, a2, b1 or b2 transmitted by a communication node, where N, N1, a1, a2, b1 and b2 are non-negative integers.

Figure 8:
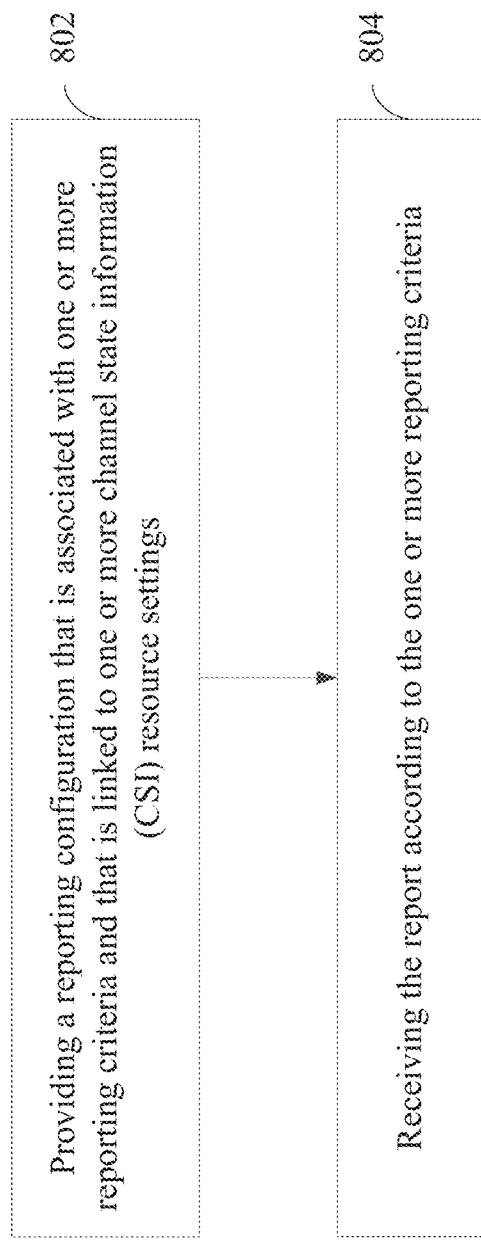
FIG. 8 shows an exemplary flowchart implemented at a base station to receive a report based on a provided reporting configuration.

FIG. 8 shows an exemplary flowchart implemented at a base station to receive a report based on a provided reporting configuration. At the providing operation 802, a communication node provides or transmits to a user equipment information related to a reporting configuration. The reporting configuration can be associated with one or more reporting criteria, and the reporting configuration can be linked to one or more channel state information (CSI) resource settings that provide configuration information to the user equipment. Each CSI resource setting can include one or more resource sets, and each resource set can include one or more reference signal resources.

At the receiving operation 804, the base station can receive the report, according to the one or more reporting criteria, the report that includes at least one of a reference signal receive power (RSRP), a rank indicator (RI), one or more reference signal indexes, and information about grouping the one or more reference signal indexes. Each reference signal index can be associated with at least one of a CSI resource setting index, a reference signal resource set index, a reference signal resource index, and a reporting configuration index.

Figure 9:
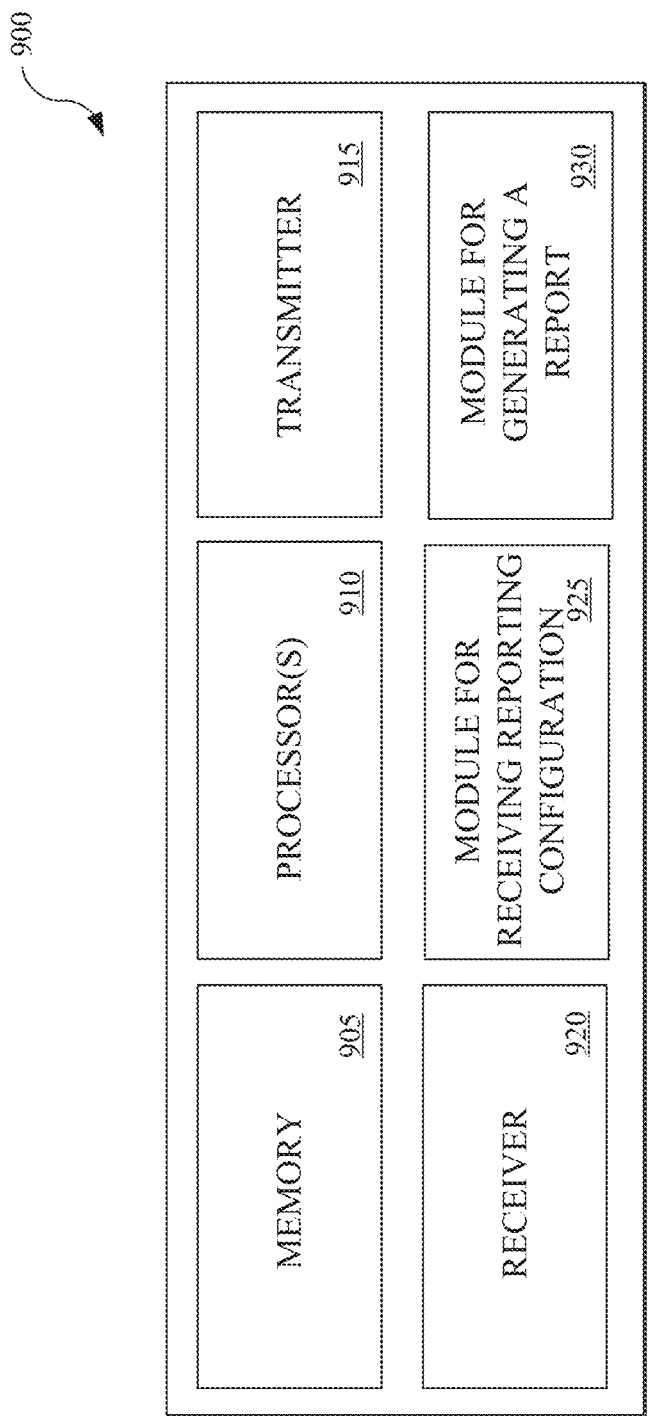
FIG. 9 shows a block diagram for an exemplary user equipment to generate a report based on one or more reporting criteria.

FIG. 9 shows a block diagram for an exemplary user equipment to generate a report based on one or more reporting criteria. The user equipment 900 includes at least one processor 910 and a memory 905 having instructions stored thereupon. The instructions upon execution by the processor 910 configure the user equipment 900 to perform several operations using the various modules of FIG. 9. The transmitter 915 transmits the information or data to a communication node, such as a gNB. The receiver 920 receives the information or data transmitted by the communication node. The module for receiving reporting configuration 925 receives a reporting configuration that is associated with one or more reporting criteria and that is linked to one or more channel state information (CSI) resource settings that provide configuration information to the user equipment.

The module for generating a report 930, generates a report according to the one or more reporting criteria. The report can include any one or more of a reference signal receive power (RSRP), a rank indicator (RI), one or more reference signal indexes, and information about grouping the one or more reference signal indexes. Each reference signal index can be associated with at least one of a CSI resource setting index, a reference signal resource set index, a reference signal resource index, and a reporting configuration index. The generated report can be transmitted via the transmitter 915 to a communication node, such as a gNB.

Figure 10:
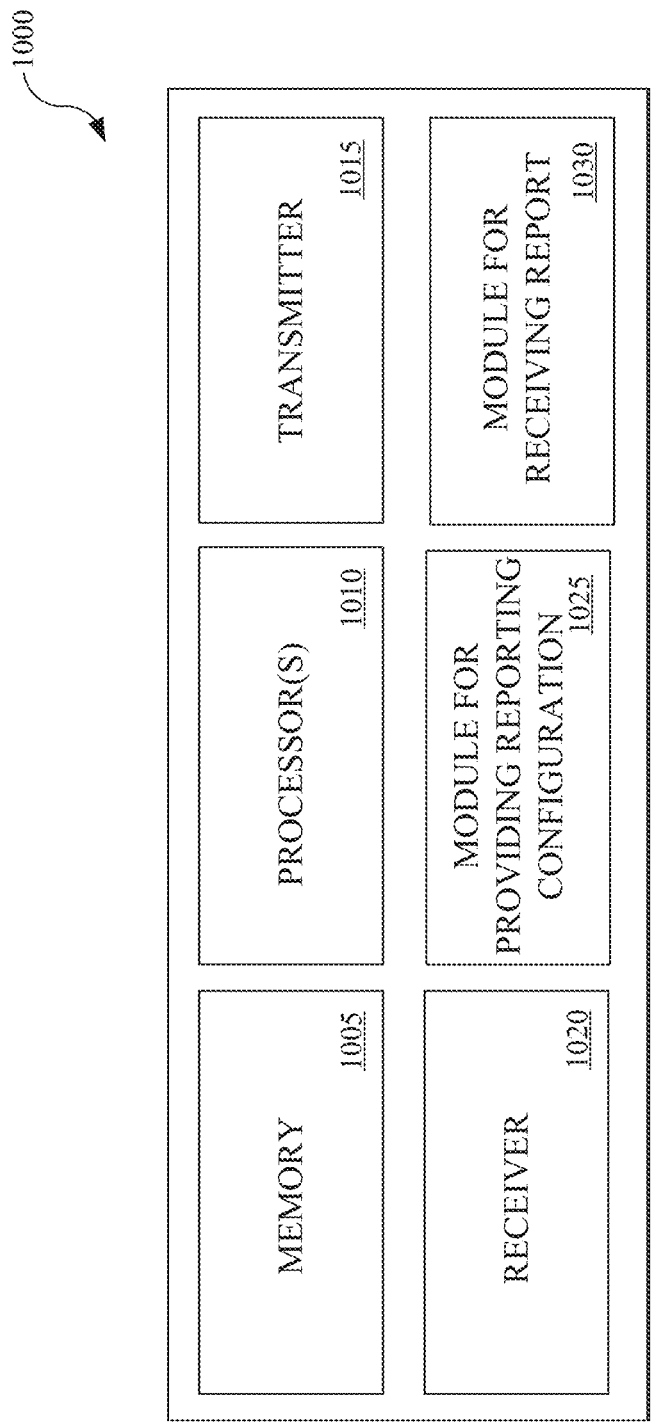
FIG. 10 shows a block diagram for an exemplary base station to receive a report based on a provided reporting configuration.

FIG. 10 shows a block diagram for an exemplary base station to receive a report based on a provided reporting configuration. The base station 1000 includes at least one processor 1010 and a memory 1005 having instructions stored thereupon. The instructions upon execution by the processor 1010 configure the base station 1000 to perform several operations using the various modules of FIG. 10. The transmitter 1015 transmits the information or data to one or more user equipment. The receiver 1020 receives the information or data transmitted by the one or more user equipment.

The module for providing reporting configuration 1025 can provide information related to a reporting configuration for transmission to a user equipment. The reporting configuration can be associated with one or more reporting criteria, and the reporting configuration can be linked to one or more channel state information (CSI) resource settings that provide configuration information to the user equipment. Each CSI resource setting can include one or more resource sets, and each resource set can include one or more reference signal resources.

The module for receiving report 1030 can receive the report from a user equipment according to the one or more reporting criteria. The report can include any one or more of a reference signal receive power (RSRP), a rank indicator (RI), one or more reference signal indexes, and information about grouping the one or more reference signal indexes. Each reference signal index can be associated with at least one of a CSI resource setting index, a reference signal resource set index, a reference signal resource index, and a reporting configuration index.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a user equipment (UE) from a base station, a reporting configuration associated with one or more reporting criteria,
  wherein the reporting configuration is associated with a plurality of resource sets, and
  wherein each resource set includes one or more reference signal resources; and
transmitting, by the UE to the base station, a report based on the one or more reporting criteria,
  wherein the report includes one or more reference signal groups into which are grouped one or more reference signal indexes,
  wherein each reference signal index is associated with a reference signal resource,
  wherein a reporting criterion from the one or more reporting criteria comprises a number of reference signal (RS) resources from one resource set to be reported, and a number of reference signal indexes per reference signal group to be reported, and
  wherein the reporting configuration includes a first criterion that indicates a maximum number of transmission beams to be transmitted simultaneously per resource set and to be included in the report per resource set.

2. The method of claim 1,
wherein the reporting configuration includes a second criterion that describes a number of transmission beams to be reported per resource set,
wherein the number of transmission beams is less than the maximum number of transmission beams.

3. The method of claim 1, wherein the one or more reference signal resources include a synchronization signal block (SSB) or a channel state information reference signal (CSI-RS).

4. The method of claim 1, wherein a number of the one or more reference signal groups included in the report is based on a number of groups to be reported.

5. The method of claim 1, wherein the one or more reporting criteria includes one or more scaling factors to scale one or more measured reference signal receive power (RSRP) associated with the one or more reference signal indexes.

6. The method of claim 1, wherein the one or more reporting criteria indicates that the one or more reference signal indexes are a subset of a resource set, wherein the subset is based on one reference signal index from the one or more reference signal indexes and a number of reference signal resources in the resource set.

7. A wireless communication method, comprising:
transmitting, by a base station to a user equipment (UE) a base station, a reporting configuration associated with one or more reporting criteria,
  wherein the reporting configuration is associated with a plurality of resource sets, and
  wherein each resource set includes one or more reference signal resources; and
receiving, by the base station from the UE, a report based on the one or more reporting criteria,
  wherein the report includes one or more reference signal groups into which are grouped one or more reference signal indexes,
  wherein each reference signal index is associated with a reference signal resource,
  wherein a reporting criterion from the one or more reporting criteria comprises a number of reference signal (RS) resources from one resource set to be reported, and a number of reference signal indexes per reference signal group to be reported, and
  wherein the reporting configuration includes a first criterion that indicates a maximum number of transmission beams to be transmitted simultaneously per resource set and to be included in the report per resource set.

8. The method of claim 7,
wherein the reporting configuration includes a second criterion that describes a number of transmission beams to be reported per resource set,
wherein the number of transmission beams is less than the maximum number of transmission beams.

9. The method of claim 7, wherein the one or more reference signal resources include a synchronization signal block (SSB) or a channel state information reference signal (CSI-RS).

10. The method of claim 7, wherein a number of the one or more reference signal groups included in the report is based on a number of groups to be reported.

11. The method of claim 7, wherein the one or more reporting criteria includes one or more scaling factors to scale one or more measured reference signal receive power (RSRP) associated with the one or more reference signal indexes.

12. The method of claim 7, wherein the one or more reporting criteria indicates that the one or more reference signal indexes are a subset of a resource set, wherein the subset is based on one reference signal index from the one or more reference signal indexes and a number of reference signal resources in the resource set.

13. A wireless communication apparatus, comprising:
a memory and a processor, wherein the processor is configured to read code from the memory and to implement a method, comprising:
receiving, from a base station, a reporting configuration associated with one or more reporting criteria,
   wherein the reporting configuration is associated with a plurality of resource sets, and
   wherein each resource set includes one or more reference signal resources; and
transmitting, to the base station, a report based on the one or more reporting criteria,
   wherein the report includes one or more reference signal groups into which are grouped one or more reference signal indexes,
   wherein each reference signal index is associated with a reference signal resource,
   wherein a reporting criterion from the one or more reporting criteria comprises a number of reference signal (RS) resources from one resource set to be reported, and a number of reference signal indexes per reference signal group to be reported, and
   wherein the reporting configuration includes a first criterion that indicates a maximum number of transmission beams to be transmitted simultaneously per resource set and to be included in the report per resource set.

14. The wireless communication apparatus of claim 13, wherein the reporting configuration includes a second criterion that describes a number of transmission beams to be reported per resource set,
wherein the number of transmission beams is less than the maximum number of transmission beams.

15. The wireless communication apparatus of claim 13, wherein the one or more reporting criteria includes one or more scaling factors to scale one or more measured reference signal receive power (RSRP) associated with the one or more reference signal indexes.

16. The wireless communication apparatus of claim 13, wherein the one or more reporting criteria indicates that the one or more reference signal indexes are a subset of a resource set, wherein the subset is based on one reference signal index from the one or more reference signal indexes and a number of reference signal resources in the resource set.

17. A wireless communication apparatus, comprising:
a memory and a processor, wherein the processor is configured to read code from the memory and to implement a method, comprising:
transmitting, to a user equipment (UE), a reporting configuration associated with one or more reporting criteria,
   wherein the reporting configuration is associated with a plurality of resource sets, and
   wherein each resource set includes one or more reference signal resources; and
receiving, from the UE, a report based on the one or more reporting criteria,
   wherein the report includes one or more reference signal groups into which are grouped one or more reference signal indexes,
   wherein each reference signal index is associated with a reference signal resource,
   wherein a reporting criterion from the one or more reporting criteria comprises a number of reference signal (RS) resources from one resource set to be reported, and a number of reference signal indexes per reference signal group to be reported, and
   wherein the reporting configuration includes a first criterion that indicates a maximum number of transmission beams to be transmitted simultaneously per resource set and to be included in the report per resource set.

18. The wireless communication apparatus of claim 17, wherein the reporting configuration includes a second criterion that describes a number of transmission beams to be reported per resource set,
wherein the number of transmission beams is less than the maximum number of transmission beams.

19. The wireless communication apparatus of claim 17, wherein the one or more reporting criteria includes one or more scaling factors to scale one or more measured reference signal receive power (RSRP) associated with the one or more reference signal indexes.

20. The wireless communication apparatus of claim 17, wherein the one or more reporting criteria indicates that the one or more reference signal indexes are a subset of a resource set, wherein the subset is based on one reference signal index from the one or more reference signal indexes and a number of reference signal resources in the resource set.

* * * * *